(12) United States Patent
DeLuca et al.

(10) Patent No.: US 11,281,992 B2
(45) Date of Patent: Mar. 22, 2022

(54) PREDICTING GEOFENCE PERFORMANCE FOR OPTIMIZED LOCATION BASED SERVICES

(71) Applicant: International Business Machines Corporation, Armonk, NY (US)

(72) Inventors: Lisa Seacat DeLuca, Baltimore, MD (US); Jeremy A. Greenberger, Raleigh, NC (US); Zachary Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1111 days.

(21) Appl. No.: 15/824,371

(22) Filed: Nov. 28, 2017

(65) Prior Publication Data
US 2019/0164081 A1    May 30, 2019

(51) Int. Cl.
| G06F 15/18 | (2006.01) |
| G06N 20/00 | (2019.01) |
| H04W 4/021 | (2018.01) |
| G06N 3/02 | (2006.01) |
| H04L 29/06 | (2006.01) |
| G06F 16/9537 | (2019.01) |
| G06N 3/10 | (2006.01) |
| G06F 30/27 | (2020.01) |
| H04L 41/147 | (2022.01) |

(Continued)

(52) U.S. Cl.
CPC ......... *G06N 20/00* (2019.01); *G06F 16/9537* (2019.01); *G06F 30/27* (2020.01); *G06N 3/02* (2013.01); *G06N 3/10* (2013.01); *H04L 41/147* (2013.01); *H04L 51/20* (2013.01); *H04L 63/107* (2013.01); *H04W 4/02* (2013.01); *H04W 4/021* (2013.01)

(58) Field of Classification Search
None
See application file for complete search history.

(56) References Cited

U.S. PATENT DOCUMENTS 9,215,559 B2    12/2015  Dave et al.
9,602,970 B1 *   3/2017  Mahapatra ............ H04W 4/022
(Continued)

OTHER PUBLICATIONS

Brown et al., "Viral geofencing: An exploration of emerging big-data driven direct digital marketing services." Proceedings of PICMET'14 Conference: Portland International Publishing, 2015, 203-2016.

(Continued)

*Primary Examiner* — Phyllis A Book
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The method computer program products, and systems can include, for instance: predicting a performance of one or more candidate geofence and presenting an indicator of a result of the predicting; obtaining administrator user defined selection data of a selected candidate geofence; based on the obtaining the selection data deploying a selected candidate geofence, the selected candidate geofence defining a deployed geofence on deployment thereof; and providing one or more output based on an occurrence of a geofence event of the deployed geofence.

20 Claims, 9 Drawing Sheets

(51) Int. Cl.
*H04W 4/02*   (2018.01)
*H04L 51/222*   (2022.01)

(56)    References Cited

U.S. PATENT DOCUMENTS

| | | | |
|---|---|---|---|
| 2012/0276928 A1 | 11/2012 | Shutter | |
| 2013/0203440 A1* | 8/2013 | Bilange | H04W 4/021 |
| | | | 455/456.2 |
| 2014/0059695 A1 | 2/2014 | Parecki et al. | |
| 2014/0162692 A1 | 6/2014 | Li et al. | |
| 2014/0164118 A1 | 6/2014 | Polachi | |
| 2015/0325064 A1* | 11/2015 | Downey | G07C 5/004 |
| | | | 701/29.3 |
| 2016/0266258 A1* | 9/2016 | Huang | G01S 19/34 |
| 2016/0316328 A1* | 10/2016 | Baran | H04W 8/02 |
| 2017/0019446 A1* | 1/2017 | Son | H04W 4/021 |
| 2017/0171707 A1* | 6/2017 | Frenz | H04W 4/021 |
| 2017/0353829 A1* | 12/2017 | Kumar | H04W 64/006 |
| 2018/0048997 A1* | 2/2018 | Cali | H04W 4/022 |
| 2018/0078843 A1* | 3/2018 | Tran | G06F 3/00 |
| 2018/0299152 A1* | 10/2018 | Libal | G05B 19/042 |

OTHER PUBLICATIONS

Streed et al., . "Optimizing geofencing for location-based services: a new application of spatial marketing." Ideas in Marketing: Finding the New and Polishing the Old. Springer International Publishing, 2015, 203-206.

Church et al.. "The Future of Marketing: Staying Competitive in a Competitive World." 115. in The Challenges of Competitiveness, D.R. © 2015, Universidad de Guadalajara.

* cited by examiner

PREDICTING GEOFENCE PERFORMANCE FOR OPTIMIZED LOCATION BASED SERVICES

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

SUMMARY

Shortcomings of the prior art are overcome, and additional advantages are provided, through the provision, in one aspect, of a method. The method can include, for example: predicting a performance of one or more candidate geofence and presenting an indicator of a result of the predicting; obtaining administrator user defined selection data of a selected candidate geofence; based on the obtaining the selection data deploying a selected candidate geofence, the selected candidate geofence defining a deployed geofence on deployment thereof; and providing one or more output based on an occurrence of a geofence event of the deployed geofence.

In another aspect, a computer program product can be provided. The computer program product can include a computer readable storage medium readable by one or more processing circuit and storing instructions for execution by one or more processor for performing a method. The method can include, for example: predicting a performance of one or more candidate geofence and presenting an indicator of a result of the predicting; obtaining administrator user defined selection data of a selected candidate geofence; based on the obtaining the selection data deploying a selected candidate geofence, the selected candidate geofence defining a deployed geofence on deployment thereof; and providing one or more output based on an occurrence of a geofence event of the deployed geofence.

In a further aspect, a system can be provided. The system can include, for example a memory. In addition, the system can include one or more processor in communication with the memory. Further, the system can include program instructions executable by the one or more processor via the memory to perform a method. The method can include, for example: predicting a performance of one or more candidate geofence and presenting an indicator of a result of the predicting; obtaining administrator user defined selection data of a selected candidate geofence; based on the obtaining the selection data deploying a selected candidate geofence, the selected candidate geofence defining a deployed geofence on deployment thereof; and providing one or more output based on an occurrence of a geofence event of the deployed geofence.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
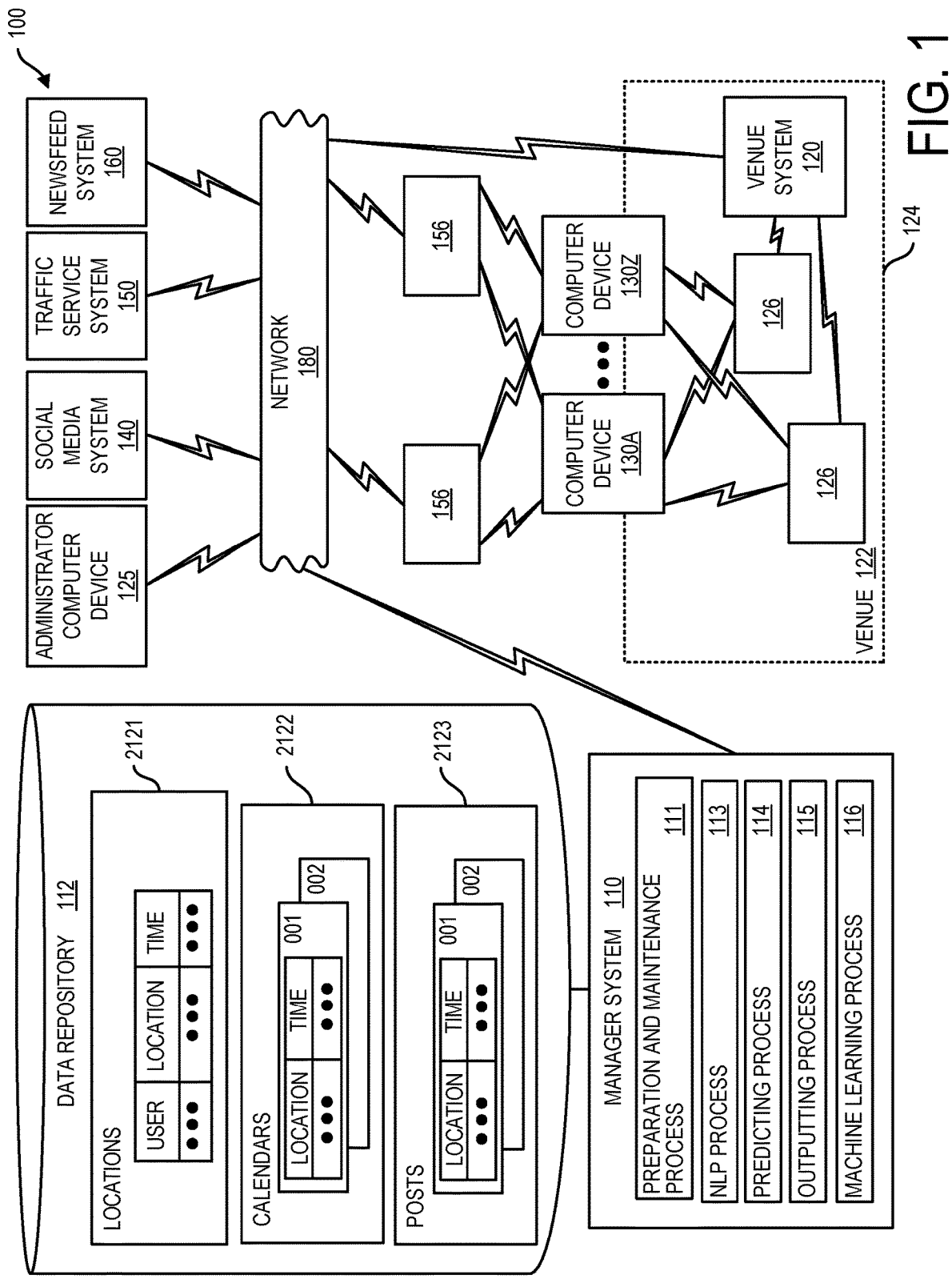
FIG. 1 depicts a system for use in supporting location based messaging services one embodiment.

System 100 for use in supporting location based messaging services is shown in FIG. 1. System 100 can include manager system 110 having an associated data repository 112, venue system 120, administrator computer device 125, a plurality of user computer devices 130A-130Z, social media system 140, traffic service system 150, and newsfeed system 160. Manager system 110, venue system 120, administrator computer device 125, a plurality of user computer devices 130A-130Z, social media system 140, traffic service system 150, and newsfeed system 160 can be in communication with one another via network 180. System 100 includes numerous devices, which may be computing node based devices, connected by a network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment manager system 110 can be external to venue system 120 social media system 140 and to each of the one or more user computer device 130A-130Z. In one embodiment manager system 110 can be co-located with venue system 120, social media system 140, traffic service system 150, and/or newsfeed system 160. In one embodiment manager system 110 can be co-located with one or more user computer device 130A-130Z.

Referring further to FIG. 1, venue system 120 can be located in venue 122 that is delimited by venue geographical border 124 that specifies the geographical coordinate area occupied by venue 122. In one embodiment, an organizational entity that operates manager system 110 can be in common with the organizational entity that operates venue system 120 and venue 122. Venue 122 can be a retail venue in one embodiment. Venue system 120 can be disposed in venue 122 defined by geographical boundary 124. User computer devices 130A-130Z can be mobile computer devices, moveable between locations, internal and external to venue 122, and thus are shown in FIG. 1 as being partially disposed within geographical boundary 124 and partially disposed external to geographical boundary 124. User computer devices 130A-130Z can be wireless computer devices that can be connected to network 180 by alternative radio communication protocols. For example, user computer devices 130A-130Z can connect to network 180 by connection nodes 156. Connection nodes 156 can be connection nodes that facilitate connection to a cellular communication network. User computer devices 130A-130Z can also be connected to network 180 via connection nodes 126. Connection nodes 126 can be provided by IEEE 802.11 access points of a WIFI wireless network provided by an operator of venue system 120, in which operator can be the operator of venue 122 and manager system 110.

In one embodiment, each computer device 130A-130Z can be associated to a certain user. In one embodiment, each user of system 100 is a registered user of a retail vendor that operates a plurality of venues such as venue 122. Users having records stored in area 2123 of data repository 112 can be registered users of manager system 110 and of the vendor e.g. can be customer loyalty card holders of the vendor who receive customer loyalty cards in exchange for data regarding themselves.

Each of the different users of user computer devices 130A-130Z can be associated to a different user. Regarding one or more user computer device 130A-130Z, a computer device of one or more user computer device 130A-130Z in one embodiment can be a computing node device provided by a client computer, e.g. a mobile device, e.g. a smartphone or tablet, a laptop, smartwatch or PC that runs one or more program, e.g. including a web browser for opening and viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Embodiments herein recognize that a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic patterns can be affected in significant ways giving rise to health risks, safety risks, and infrastructure building layout designed concerns.

Manager system 110 can run various processes including preparation and maintenance process 111, Natural Language Processing (NLP) process 113, predicting process 114, outputting process 115, and machine learning process 116.

Manager system 110 can run preparation and maintenance process 111 to populate and maintain data of data repository 112 for use by various processes run by manager system 110 including e.g. predicting process 114.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 can run predicting process 114 to predict performance of a candidate geofence. In one embodiment performance of a geofence can be measured in terms of breaches. Predicting process 114 in one embodiment can predict performance of a geofence based on a function of weighted factors.

Manager system 110 can run outputting process 115 to provide one or more output based on a deployed geofence being breached or another geofence event such as a dwell or a geofence expiration. A provided output can include e.g. a notification or a communication to initiate a process such as machine learning process 116 for monitoring performance of a deployed geofence.

Manager system 110 can run machine learning process 116 to monitor performance of a geofence that has been deployed. Based on the monitoring a method for performance in accordance with predicting process 114 can be updated. The accuracy and reliability of predicting performed according to predicting process 114 can increase over time.

In accordance with machine learning process 116, manager system 110 can examine results obtained by performance of predicting process 117 and based on the examining can adjust predicting process 117.

Data repository 112 can include locations area 2121 which can include historical data on locations visited by users of system 100. As users move throughout an environment their movement can be traced and logged into locations area 2121. In one embodiment, locations area 2121 can include a table associating users within their respective locations (e.g. given in coordinates) and each location can be associated with a time stamp. Thus, manager system 110 is able to perform a variety of useful analyses, e.g. can ascertain a performance of a hypothetical geofence had a hypothetical geofence been previously deployed at a certain previous point in time. The performance of a hypothetical geofence can be ascertained in terms of events associated with a geofence, e.g. a number of breaches or a number of dwells (a user remaining within a geofence for more than a threshold period of time). For providing of location data that specifies a location of users of system 100, system 100 can be configured to provide locating services. Locating services can be e.g. control plane based, self-reported based, local range based or a combination of the noted types. In one embodiment, locating services provided by system 100 can locate a computer device of computer devices 130A-130Z using e.g. GPS based locating services, located services based on processing of signals received by connection nodes 156 (cellular network), locating services based on processing of signals received by connection nodes 126 (LAN) or a combination of such services.

Data repository 112 can include calendars area 2122. For each user, e.g. user 001, 002, etc., manager system 110 can store in calendars area 2122 data of expected future locations of the user. Manager system 110 can iteratively examine calendar data of each user of system 100 to determine an expected future location for each user based on calendar commitments. User calendars can be located, e.g. on social media system 140 and/or locally on user computer devices 130A-130Z, of the respective users of system 100.

Data repository 112 in posts area 2123 can store data on an expected future location of each user, e.g. user 001, 002, etc. as determined based on an examination of posts of the user, e.g., as entered by the user into social media system 140. Manager system 110 can iteratively examine content of each users posts and can activate NLP process 113 to identify times and locations that are specified in user posts. Based on such examining, manager system 110 can store an expected set of future locations of each user based on social media posts in social media system 140. Posts area 2123 can store for each of several users specified future locations of the user associated times of the expected locations based on examination of posts data.

Figure 2:
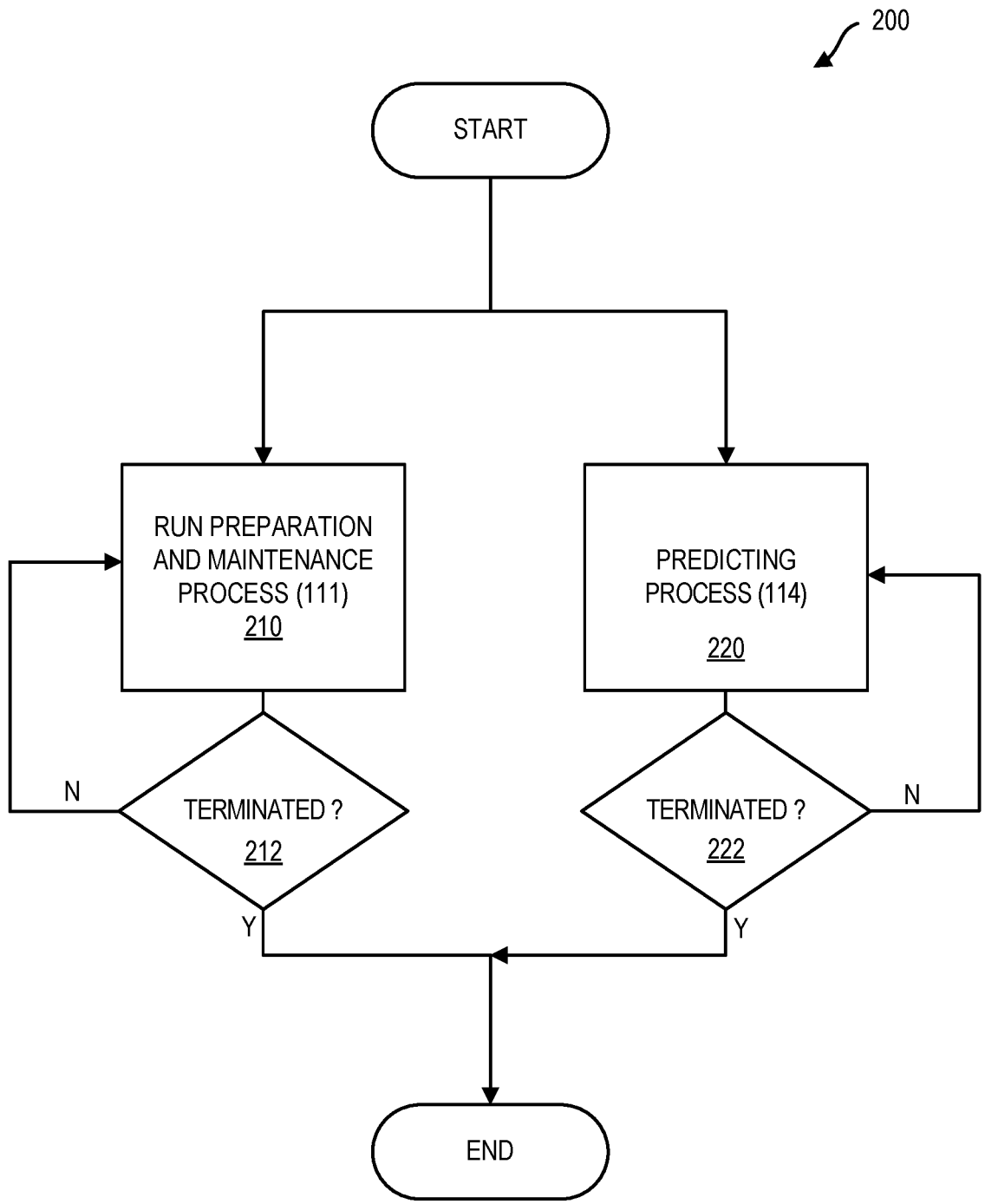
FIG. 2 is a flowchart illustrating a method for performance by a manager system according to one embodiment.

FIG. 2 depicts a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of locations area 2121, calendars area 2122, and posts area 2123. Manager system 110 can run preparation and maintenance process 111 iteratively until process 111 is terminated at block 212.

At block 220, manager system 110 can run predicting process 114 to predict performance of one or more candidate geofence. For support of running of predicting process 114 iteratively, manager system 110 can be running e.g. NLP process 113, outputting process 115, and/or machine learning process 116 iteratively. Manager system 110 can run predicting process 114 until predicting process 114 is terminated at block 222. Manager system 110 can run preparation and maintenance process 111 and predicting process 114 concurrently and can run each of process 111 and process 114 iteratively.

For performance of preparation and maintenance process 111, manager system 110 can be configured to automatically process, e.g. including by running of NLP process 113, messages that are generated by system 100. In one embodiment manager system 110 for performance of block 210 can instantiate structured data records in areas 2121-2123 that are adapted for use by predicting process 114.

For instantiation of records into locations area 2121 manager system 110 can monitor data messages output by location services of system 100, regarding the respective locations of users of user computer devices 130A-130Z. Data repository 112 can store a history of locations of users of user computer devices 130A-130Z over time in locations area 2121.

For instantiation of records into calendars area 2122 and posts area 2123 manager system 110 can iteratively examine calendars of users of system 100 and social media posts of users of system 100. Manager system 110 can activate NLP process 113 for examining content of user calendars and/or user posts.

Figure 3:
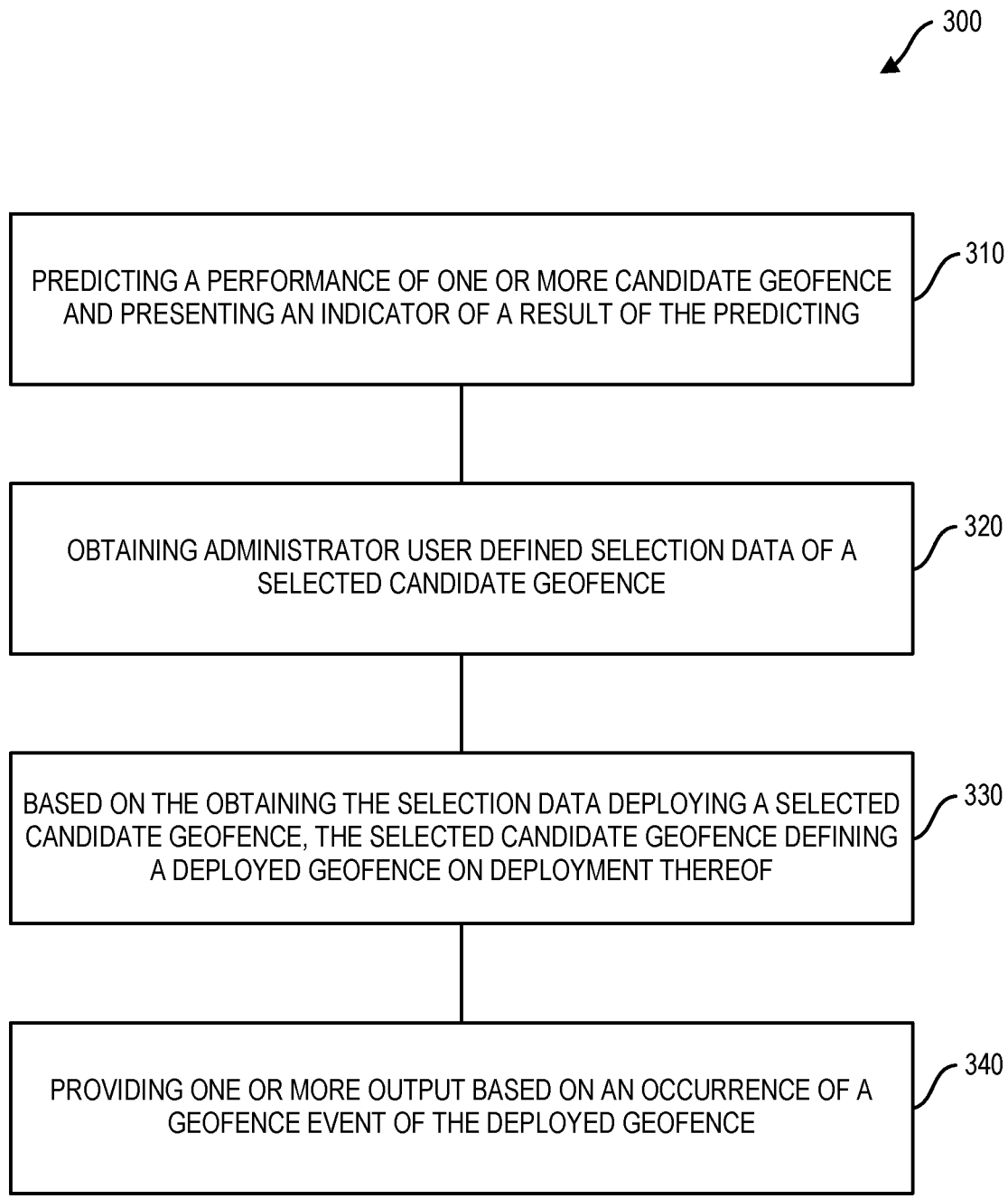
FIG. 3 is a flowchart illustrating a method for performance by a manager system according to one embodiment.

A method 300 for performance by manager system 110 is illustrated with reference to FIG. 3. At block 310, manager system 110 can perform predicting a performance of one or more candidate geofence and presenting an indicator of a result of the predicting. At block 320 manager system 110 can perform obtaining administrator user defined selection data of a selected candidate geofence. At block 330 manager system 110 based on the obtaining the selection data deploying a selected candidate geofence, the selected candidate geofence defining a deployed geofence on deployment thereof. At block 340 manager system 110 can perform providing one or more output based on an occurrence of a geofence event of the deployed geofence.

Figure 4:
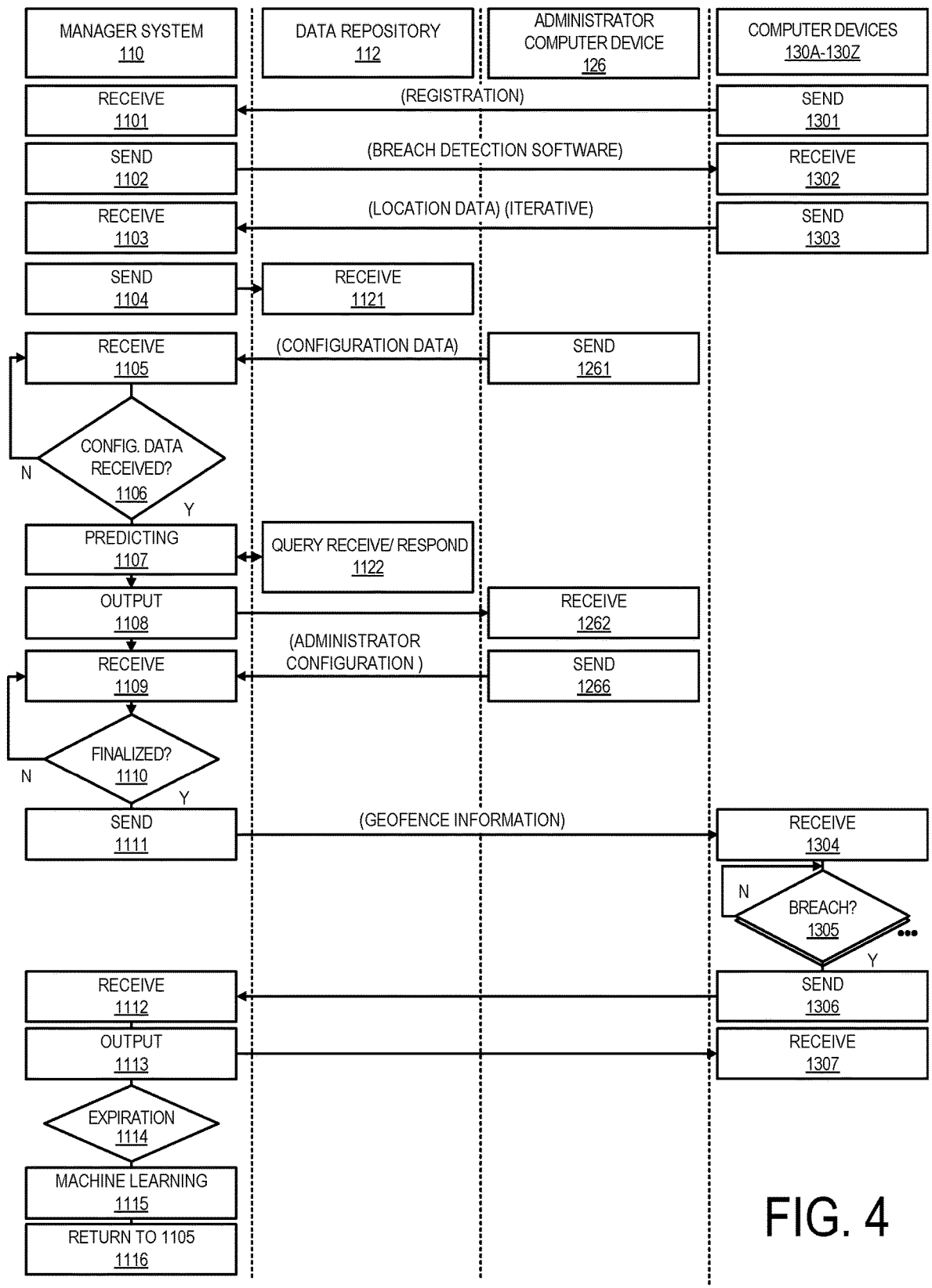
FIG. 4 is a flowchart illustrating a method for performance by a system having a manager system and user computer devices according to one embodiment.

A specific example of method 300 is set forth in reference to the flowchart of FIG. 4 illustrating a specific example of method 300 from the perspective of manager system 110, data repository 112, administrator computer device 125, and user computer devices 130A-130Z.

At block 1301, user computer devices 130A-130Z can send registration request data for receipt by manager system 110 at block 1101. Users of user computer devices 130A-130Z can register their respective user computer devices 130A-130Z to participate in a location based messaging services, in which messages are delivered to computer devices of user computer devices 130A-130Z based on a location of the computer devices.

One example is a customer support service, wherein users of user computer devices 130A-130Z are customers of an entity such as a retail or restaurant organization having numerous venues throughout a geographical area, may wish to better communicate with its customers by way of a location based messaging service. In one common use case, the service may recognize that a customer has reached a location in proximity with the venue. Based on such recognition the service may notify the customer of a special offer available at the venue, to entice the customer to travel to the venue. On reaching the venue of a retail or restaurant organization may send a location based message to the customer to entice the customer to travel to a specific location within the venue. An administrator user can define parameters of a location based messaging service using an administrator user interface such as administrator user interface 500 (FIG. 5) and/or administrator user interface 600 (FIG. 6) as set forth herein. Administrator user interface 500 and administrator user interface 600 can be manually operated user interfaces displayed on a display of an administrator computer device 125. Registration request data sent at block 1301 for receipt at block 1101 can include, e.g. name and contact information of a user of a computer device as well as other information in facilitating messaging of the user by the manager system 110, e.g. messaging service, account information to allow messages to be received e.g. text based notifications to be received by a customer.

On receipt of registration request data at block 1101, manager system 110 can register a user and can send at block 1102 location based messaging software to user computer devices 130A-130Z, from which registration requests have been received. Location based messaging software, received by user computer devices 130A-130Z at block 1302, can include software that allows respective user computer devices 130A-130Z to determine, locally on the respective computing nodes, that a geofence event has occurred or that a geofence expiration has occurred. Events can include e.g. geofence breaches, geofence area dwells, and geofence expiration. A dwell can be regarded to have occurred on a computer device 130A-130Z if it remains within a geofence area for more than a threshold period of time. With a location based messaging software installed on a computer device, a computer device is able to determine that an event has occurred. On the determining that an event has occurred, a certain computer device of user computer devices 130A-130Z can send a notification to manager system 110, which can then respond by providing one or more output, e.g. such as an output notification to the certain computer device.

At blocks 1303 computer devices 130A-130Z can send location data reporting their current location for receipt by manager system 110 at block 1103. The sending at block 1303 can be iterative and can be ongoing concurrently with remaining processes. Manager system 110 can additionally or alternatively be iteratively receiving location data reporting the respective locations of computer devices from other data sources, e.g. sources associated with a cellular and/or LAN based locating service.

Figure 5:
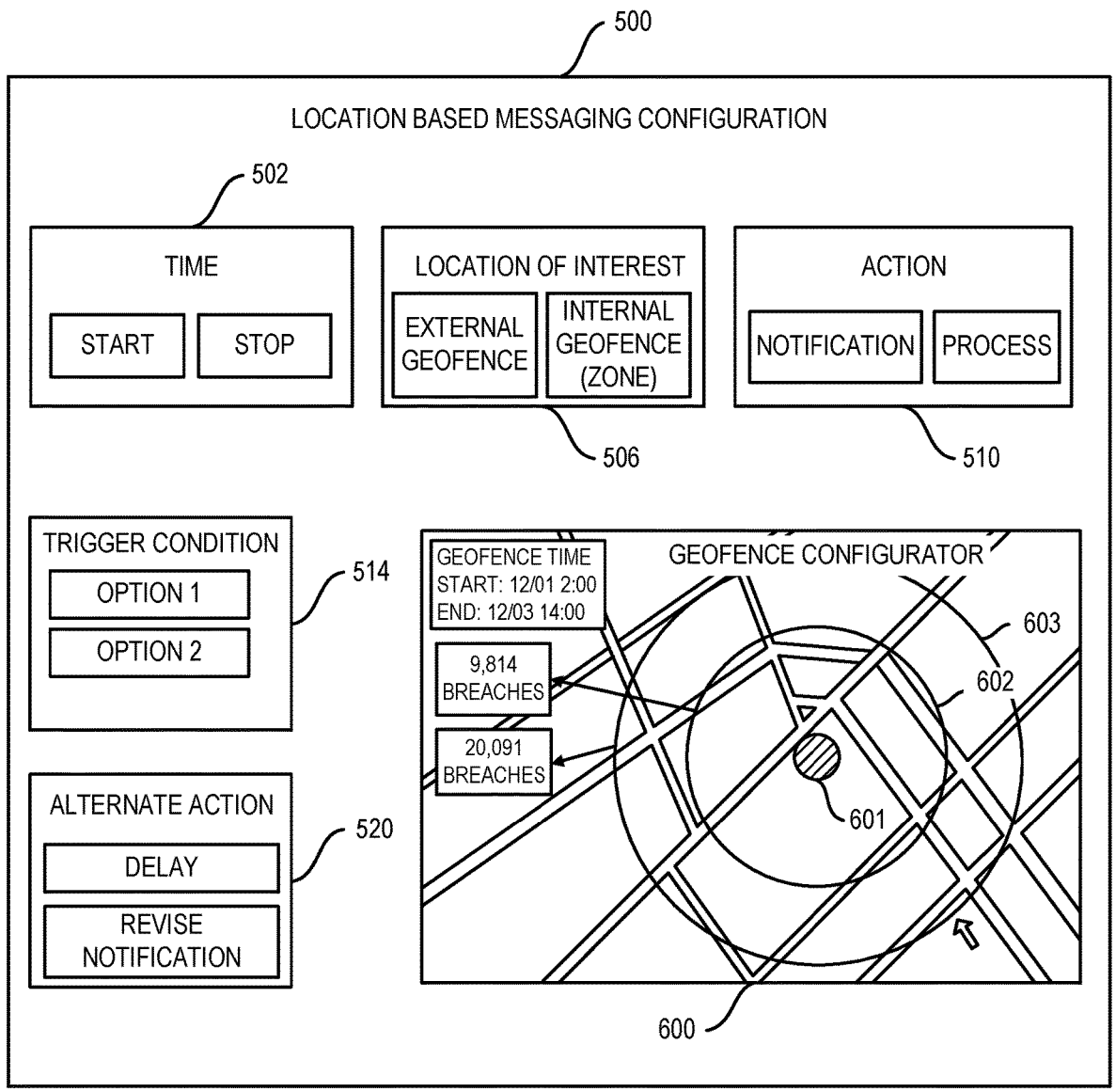
FIG. 5 depicts a displayed user interface for use by an administrator user.

At block 1261, administrator computer device 125 can send configuration data for receipt by manager system 110 at block 1105. Configuration data sent at block 1261 can include data that configures manager system 110 to output one or more location based message. The administrator user interface 500, for use by an administrator user establishing location based messaging service configuration data as shown in FIG. 5. Using area 502, an administrator can specify a start time and a stop time of a location based messaging service. Using area 506, an administrator user, using administrator user interface 500 can specify a location of interest, e.g. the nominal coordinates of a geofence. The nominal coordinates can later be updated using features of a geofence configurator administrator user interface 600 as set forth herein. The geofence that is specified can include e.g. a venue external geofence or a venue internal geofence. A venue internal geofence herein can be referred to as a "zone". Using area 510, an administrator user can specify an action to be performed on the occurrence of an event. Geofences in one embodiment can specify a two-dimensional area determined by a perimeter. The one or more action can include e.g. a notification and/or a process. A notification can include a text based message sent via a messaging system to a user computer device. An action can include an automated process e.g. a machine learning process in which performance of system 100 is monitored e.g. using one or more sensor such as a radio receiver for use in obtaining location data. Using area 514, an administrator user can specify a trigger condition. A trigger condition can be e.g. an event that triggers the providing of one or more output. A trigger condition can include e.g. a user computer device breaching a geofence and/or a dwell event wherein the user computer device remains within an area of a geofence for more than a threshold period of time.

At block 1106, manager system 110 can determine that configuration data specifying parameters of a new location based messaging service has been received. At block 1107 based on receiving configuration data to define parameters for a location based messaging service, manager system 110 can perform predicting of a performance of one or more candidate geofence.

For purposes of illustration, candidate geofences herein are symmetrical and circular. However, it will be noted that candidate geofences herein can have perimeters of any shape. Based on configuration data received at block 1105, manager system 110 at block 1107 can perform predicting of a performance of one or more candidate geofence. Candidate geofences can be generated based on the configuration data. For example, if configuration data received specifies nominal size for a geofence e.g. described in terms of center point radius perimeter and the like manager system 110 can use the specified nominal geofence as a candidate geofence and can generate one or more additional candidate geofences having sizes based on the size of the specified nominally sized geofence, e.g. having one or more sizes incrementally larger and/or incrementally smaller. In one aspect, a purpose and function of the candidate geofences generated at predicting block 1107 can be to visualize performance of candidate geofences of different sizes. Thus, system 100 can provide an administrator user feedback for use in selecting in final configuration of a geofence to be deployed. Based on features herein a candidate geofence selected for deployment can be selected with great accuracy, reducing the risk that a replacement geofence will need to be deployed.

Figure 6:
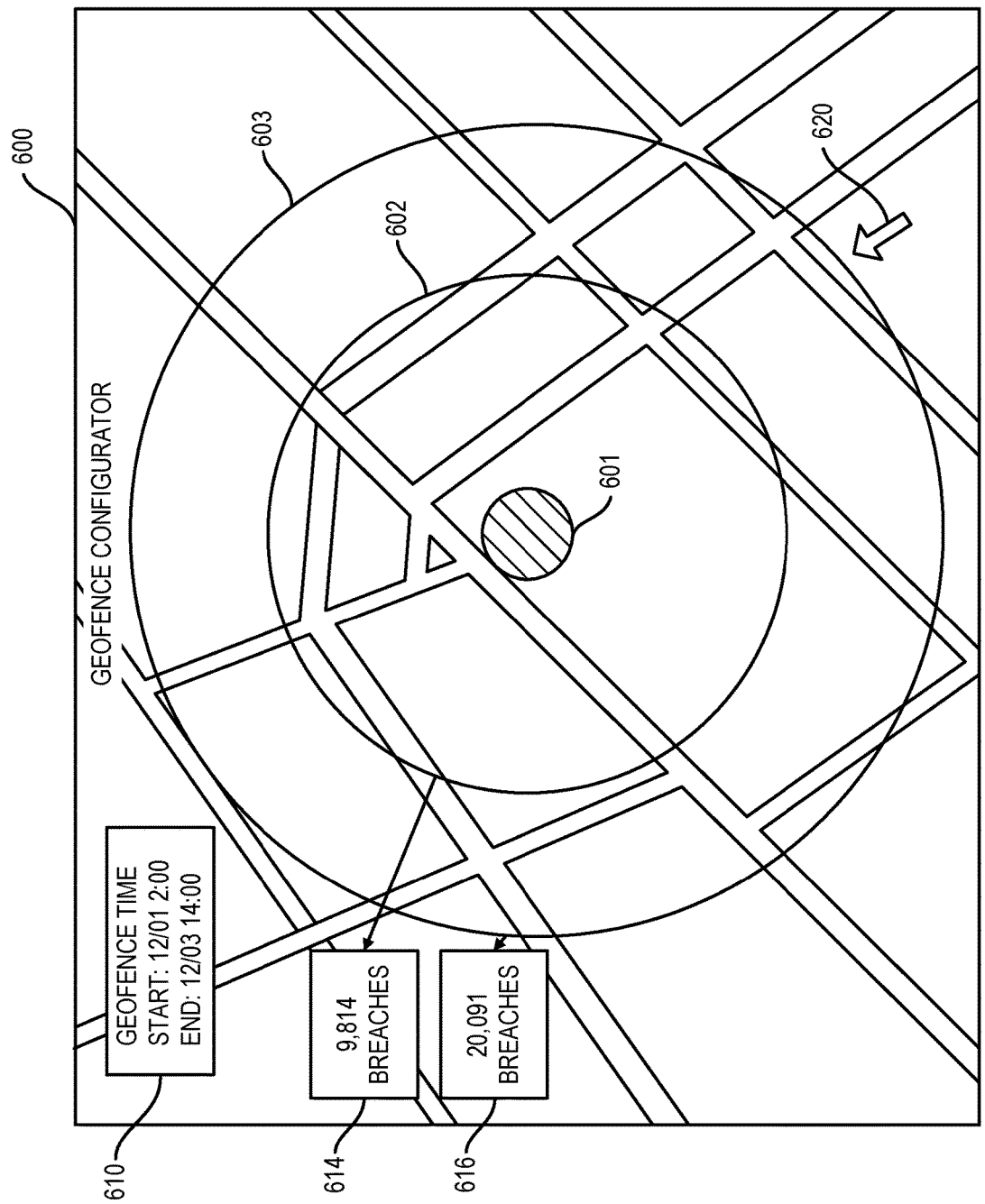
FIG. 6 depicts a displayed user interface for use by an administrator user.

Referring to FIG. 6 there is shown a geofence configurator administrator user interface 600. Geofence configurator administrator user interface 600 can be displayed on a display of an administrator computer device 125. Geofence configurator administrator user interface 600 allows an administrator user to visualize a performance of various candidate geofences of various different sizes and can generate and evaluate candidate geofences based on administrator user input data. According to FIG. 6, there is shown perimeter 602 representing the area of a first candidate geofence and perimeter 603 representing an area of a second candidate geofence. The candidate geofence represented by perimeter 602 and the candidate geofence represented by perimeter 603 can be generated based on the configuration data sent at block 1261 using administrator user interface 500 of which geofence configurator administrator user interface 600 can be included. Referring to geofence configurator administrator user interface 600, a user can view depictions of anticipated predicted numbers of breaches for the various depicted geofences of different size. Using area 610, an administrator user can specify time periods of a geofence, i.e., the time period in which the geofence is active to be used as a data source for determining of the sending of messages. Using area 610, an administrator user can specify for example, that a particular geofence will be active from the time of 2:00 on the date December 2001 until the time 14:00 on the date December 2003. In area 614 it is depicted that the smaller geofence defined by perimeter 602 is predicted to have 9,814 breaches in the specified timeframe. Whereas the larger geofence defined by perimeter 603 is predicted to have 20,091 breaches in the specified timeframe. Manager system 110 can be configured so that the displayed number of breaches is automatically updated when an administrator user adjusts a time period for a geofence. There is set forth herein accordingly a method including simultaneously displaying an indicator of performance of candidate geofence and an administrator user interface, wherein the administrator user interface facilitates entry of one or more input by an administrator user to define the administrator user defined selection data of a selected candidate geofence.

In one embodiment, candidate geofences can encompass a location of interest such as a venue. Location of interest 601 depicted in geofence configurator administrator user interface 600 can be at a location of a venue.

Geofence configurator administrator user interface 600 can have additional functionality. For example, geofence configuration administrator user interface 600 can be provided so that the user can use pointer 620 to provide input into geofence configurator administrator user interface 600. For example, geofence configurator administrator user interface 600 can be configured so that a user can use pointer 620 to point and click onto the depicted perimeter, e.g. perimeter 602 or 603 and then drag inward or outward to change the size of the depicted perimeter representing a geofence. The user can point and click onto a perimeter and then drag inward to make the perimeter, e.g. perimeter 602 or 603 smaller, or can point, click, and drag outward to make the perimeter, e.g. perimeter 602 or 603, larger. Geofence configurator administrator user interface 600 can be configured so that when the user changes the size of the display perimeter, a predicted number of breaches during the specified time displayed in area 614 or 616 automatically changes, e.g. will expectedly increase if the perimeter is made larger or decrease if the perimeter is made smaller. In another aspect, geofence configurator administrator user interface 600 can be provided so that the user can enter a target number of breaches in area 614 or 616, e.g. can preset to a certain value e.g. 5,000 breaches or 30,000 breaches. In response to the user entering the specified target value, manager system 110 can automatically generate iteratively a number of candidate geofences having different perimeters and can automatically predict performance of each candidate geofence until a candidate geofence yielding the target number of breaches is determined to have been generated based on the candidate geofences predicted number of breaches coinciding with the target number of breaches. In another aspect, geofence configurator administrator user interface 600 can be configured so that upon a prespecified one or more user input a displayed candidate geofence is deployed. For example, manager system 110 can be configured so that a displayed candidate geofence represented by a perimeter is automatically deployed based on a user using pointer 620 to double-click the represented geofence e.g. double-clicking a displayed perimeter representing a candidate geofence.

In one embodiment, manager system 110 for predicting performance of a candidate geofence can apply the formula of Eq. 1 below.

$$P = F_1 W_1 + F_2 W_2 + F_3 W_3 + F_4 W_4 + F_5 W_5 + F_6 W_6 \quad \text{(Eq. 1)}$$

Where $F_1$-$F_6$ are different factors, $W_1$-$W_6$ are weights associated respectively with the different factors, and where "P" is the overall predicted performance of the candidate geofence based on the multiple weighted factors.

In one embodiment, factor $F_1$ can be a location trends factor. Manager system 110 can store data in locations area 2121 respecting the location of multiple users of user computer devices 130A-130Z over time. Manager system 110 can use historical data of locations area 2121 of data repository 112 as set forth herein to construct data on the actual number of breaches that would have occurred if the candidate geofence had been deployed at a previous one or more period of time, where the previous one or more period of time is selected based on having a low (as measured using a threshold) dissimilarity score relative to a selected period of time. Prior sample time periods for use in constructing the analysis can be selected to have time periods matching the time period specified in area 610 of geofence configurator administrator user interface 600. Manager system 110 can apply further matching algorithms to select time periods matching the profile of the specified time period, specified in area 610 e.g. manager system 110 can classify various time periods into different classifications such as weekday, weekend, winter, spring, summer, fall, or holiday.

Regarding factor $F_2$, factor $F_2$ can be a local traffic maps factor. For generating a prediction under factor $F_2$, manager system 110 can use data received by manager system 110 from traffic service system 150. According to factor $F_2$ a geofence performance prediction can be provided that takes into account traffic conditions as may be influenced, e.g. by accidents, weather, and/or road work. Manager system 110 can increase the weight $W_2$ associated with factor $F_2$ where the time period of the geofence is close in time to the current time in which case traffic pattern information from traffic service system 150 can be expected to be more accurate.

Factor $F_3$ can be an entertainment event factor. Manager system 110 can examine data received from newsfeed system 160 to determine if there are any entertainment events at the candidate geofence locations coinciding with time period specified in area 610 of geofence configurator administrator user interface 600, e.g. sporting events, conventions, or other entertainment events. Manager system 110 can provide a higher geofence event count prediction according to factor $F_3$ where there are no conflicting entertainment events conflicting with the location time period of the candidate geofence and a lower geofence event count prediction where there are entertainment events conflicting with the candidate geofence location and time.

According to factors $F_4$ and $F_5$, manager system 110 can examine data of specific users of system 100 that specifies possible future actions of the user. Factor $F_4$ can be a calendar event factor for obtaining data for use according to factor $F_4$, manager system 110 can examine personal calendars of users of the plurality of users of user computer devices 130A-130Z. Manager system 110 can identify conflicts with the specified geofence timeframe specified in area 610 and where a conflict is identified, can predict that a certain user having the conflicting calendar item will not breach the candidate geofence in the specified time. Manager system 110 can perform a determination for users of the plurality of users of user computer devices 130A-130Z e.g. each user or a sample of such users in generating a prediction based on personal calendar data under factor $F_4$. Performance of predicting according to factor $F_4$ can include activation of NLP process 113 and can include processes described herein for populating calendars area 2122 of data repository 112.

According to factor $F_5$, manager system 110 can predict performance of a candidate geofence based on tag media of users of the plurality of users using user computer devices 130A-130Z. For example, according to factor $F_5$, manager system 110 can examine social media posts of users or posted geotagged photos posted by users of the plurality of users using user computer devices 130A-130Z as posted on one or more social media system 140. According to factor $F_5$ NLP process 113 can be activated. The examining of posts content for performing a prediction according to factor $F_5$ can include examining posts content for purposes of populating posts area 2123 of data repository 112 as set forth herein. For generating prediction according to factor $F_5$, manager system 110 can activate NLP process 113 for processing of social media posts to determine classifications thereof, e.g. that reference that a certain user will be at a certain location at a specified geofence timeframe specified in area 610 of geofence configurator administrator user interface 600. Where a user's location as determined by text based processing of a social media post conflicts with a location of a geofence during a specified time, manager system 110 can determine that such user will not be breaching the geofence and thus can alter the predicted performance of the candidate geofence under factors $F_5$. The same processing can be performed for several users. Geotagged photos can specify a location at which a posted photo was taken. If it is identified that there is a breach of several users, manager system 110 can determine that a user cannot breach a geofence at a specified time according to geotagged photographs being at a conflicting location at a time that a posted photograph was taken.

Factor $F_6$ can be an item need factor, e.g. a geofence can be employed to trigger notifications to users encouraging users to visit a location of interest, e.g. a venue. In some scenarios, items within a venue can be in especially high demand, e.g. if there is a fuel shortage or an anticipated power outage, generators or generator equipment may be in high demand. There are other examples such as, based on weather patterns different fruit or vegetable items may be in particularly high demand. According to item demand factor $F_6$, manager system 110 can increase the predicted likelihood of a user breaching a geofence if an item specified in a notification associated with a candidate geofence is in demand and can reduce the predicted likelihood of a breach, where an item associated with a candidate geofence is not in demand. Manager system 110 can activate NLP process 113 for examining posted content of social media system 140 for determining information of products that are in demand.

At block 1107, manager system 110 can perform predicting performance of a geofence as set forth herein, e.g. can perform with reference to FIG. 6, predicting the performance of the candidate geofence, indicated by perimeter 602 and also can perform predicting the performance of the candidate geofence depicted by perimeter 603. Predicting at block 1107 can include use of Eq. 1 as set forth herein and can include multiple queries of data repository 112 as indicated by query received and respond block 1122, performed by data repository 112.

At block 1108, manager system 110 can perform outputting of data indicating the predicted performance of a candidate geofence for receipt by administrator computer device 125 at block 1262. Referring again to the example of the geofence configurator administrator user interface 600 of FIG. 6, data indicating the predicted performance of various geofences can be displayed on a display of geofence configurator user interface 600. For example, in area 614 there can be displayed data indicating that the predicted performance of the candidate geofence having perimeter 602 and at area 616 there can be display data indicating predicted performance on the candidate geofence depicted by perimeter 603. As has been indicated, an administrator user using administrator user interface 600 can enter one or more input into geofence configurator administrator user interface 600. The action of an administrator user entering a control input using interface 600 is depicted in FIG. 4, by send block 1266 for receipt by manager system 110 at block 1109. The administrator user inputs can include various types of inputs, e.g. clicking on a perimeter 602 or 603 depicting a candidate geofence, dragging inward or outward the perimeter to change the size of the perimeter by double-clicking a perimeter to select a candidate geofence for deployment as a deployed geofence.

Manager system 110 can be configured so that, as an administrator user enters control inputs such as the described, manager system 110 can responsively update the predicting performed at predicting block 1107 based on the new information entered by the administrator user. For example, where an administrator user enters control inputs specifying a changed size of a candidate geofence, manager system 110 can update the predicting performed at block 1107 to reflect the change of size.

Accordingly, based on the foregoing description, manager system 110 at block 1110 can determine whether configuration data defined by an administrator user specifies a final selection of an administrator user, e.g. as might be specified using a double-click of a perimeter depicting a candidate geofence. Based on a determination that an administrator user has not finally selected a candidate geofence, manager system 110 can return to block 1107 to update a predicting and the loop indicated by blocks 1108, 1262, 1266, 1109, and 1110 can continue until an administrator user enters configuration data specifying a final selection of a candidate geofence (e.g. by an administrator user double-clicking a displayed perimeter illustrating a geofence). While the depicted loop continues, manager system 110 can iteratively perform updated predictions (block 1107) and can iteratively output data indicating predicted performance of a candidate geofence, e.g. as in the number of breaches data, depicted in area 614 or 616 as shown in FIG. 6.

Referring again to FIG. 6, an administrator user can enter control inputs other than control inputs to change a size of an indicated candidate geofence. For example, an administrator user can use geofence configurator administrator user interface 600 to change a location of a candidate geofence indicating perimeter, e.g. perimeter 602 in relation to a depicted location of interest 601. For example, an administrator user can use geofence configurator administrator user interface 600 to change a location of a depicted geofence so that the depicted geofence is offset from and not perfectly centered on a location of interest 601. Manager system 110 can update a predicting based on the change of location and can output predicted results of the changes in area 614 or area 616, depending on the candidate geofence being altered. An administrator user can also use geofence configurator administrator user interface 600 to change a shape of a geofence. In the example of FIG. 6, the depicted candidate geofences are depicted by circular perimeters, however geofences can be characterized by alternatively shaped perimeters, e.g. oval, polygonal, or any arbitrary shape.

Based on manager system 110 determining that an administrator user has finalized the selection of a candidate geofence for deployment as a deployed geofence, manager system 110 can proceed to block 1111 to deploy the selected geofence. At block 1111 manager system 110 can send geofence information to computer devices of user computer devices 130A-130Z for receipt by computer devices of user computer devices 130A-130Z at block 1304. Thus, at block 1304, computer devices of user computer devices 130A-130Z can have information of the coordinates of the selected geofence and thus are enabled to perform geofence breach determinations locally on their respective hardware platforms.

Embodiments herein recognize that advantages can accrue by distributing breach detection software to computer device 130A-130Z (block 1102) so that computer devices 130A-130Z are enabled to determine, locally on their respective hardware platforms, geofence breaches once geofence information is received (block 1304). In one aspect, the determination of geofence breaches locally, at computer device 130A-130Z can reduce power consumption to increase battery life of user computer devices 130A-130Z. Resource consumption associated with geofence breach determinations can be less than resource consumption levels associated with an alternative scheme in which location data is iteratively transmitted externally to manager system 110 for processing for breach determination externally from user computer devices 130A-130Z. The determination of geofence breaches locally, by respective user computer devices 130A-130Z can reduce wireless data traffic in an environment, thereby increasing available bandwidth, which is of increased importance in bandwidth limited 5G and Internet of Things (TOT) environment. The determination of geofence breaches locally by respective user computer devices 130A-130Z can increase determination speed and reduce latency relative to latency associated with an alternative scheme in which geofence breaches are determined remotely by manager system 110. The determination of geofence breaches locally, by user computer devices 130A-130Z can also increase determination accuracy. In an alternative embodiment where geofence breach determination is performed remotely, e.g. on manager system 110 where manager system 110 is remote from user computer devices 130A-130Z, a determination might be made based on a past location of a user computer device that is no longer accurate. Also, geofence determinations can be dependent on network connectivity. In some use cases, manager system 110 can send with geofence information at block 1111 to a certain computer device, textual message data, specifying content of a textual based message that can be output by the certain computer device responsive to a breach being detected. Embodiments herein recognize that while advantages associated with client distributed logic for geofence event determination can be substantial, the advantages may not be yielded if a deployed geofence is not accurately deployed. Re-deployment can create risks and resource consumption that outweigh the benefits of client distributed geofence event determination logic.

Referring again to the flowchart of FIG. 4, user computer devices 130A-130Z, at block 1305 can determine if a geofence deployed locally based on data received at block 1304, has been breached. Block 1305 is depicted in FIG. 4 in double-lined format to indicate that block 1305 can be performed separately and contemporaneously at each computer device of user computer devices 130A-130Z. On the determination that a breach has occurred, a computer device, e.g. computer device 130A detecting that a breach has occurred, can send a notification at block 1306 for receipt by manager system 110 at block 1112 indicating that a breach has occurred. Responsively, manager system 110 can provide one or more output. The one or more output can include, e.g. a notification to the computer device, e.g. computer device 130A for receipt by computer device 130A at block 1307. The notification can include e.g. a promotional message prompting a user to travel to a location of interest, e.g. a location of a venue within a geofence that has been breached (e.g. where the geofence is delimited by a perimeter encompassing and spaced apart from a venue). The one or more output provided at block 1113 can include one or more output other than a notification output. The output can include, e.g., a communication to activate a process e.g. machine learning process 116.

Manager system 110 at block 1114 can determine that a geofence expiration has occurred. Based on the geofence time being expired, manager system 110 can proceed to machine learning block 1115, to continue to run machine learning process 116 which may have been activated previously, based on another computer device breaching an active geofence.

Based on the determination that a geofence expiration has not occurred, manager system 110 can return to block 1112 to wait for notifications of breaches by other computer devices, e.g. other than the certain computer device 130A and can continue with the loop including block 1112, 1113, and 1114 until a geofence expiration has occurred (block 1114). Manager system 110 at machine learning block 1115 can score the accuracy of a predicting performed at block 1107 for each of several users of user computer devices 130A-130Z. At machine learning block 1115, manager system 110 can score, as a positive prediction, each instance where the user predicted to breach did in fact breach, and/or where the user predicted not to breach the geofence did not actually breach. Manager system 110 at block 1115, can score as a negative prediction, each instance where a user predicted not to breach actually breached and/or each instance where the user predicted to breach the geofence within a specified active period for a geofence did not actually breach. Manager system 110, at block 1115 can provide an overall accuracy score specifying prediction accuracy for the current geofence. The accuracy score can be used as an input into Eq. 1. Manager system 110 can be providing accuracy scores for multiple geofences over time and for each geofence, the geofence accuracy score can be used as an input into Eq. 1 so that the quality of prediction provided by Eq. 1 increases over time based on historical data and in accordance with machine learning principles. In one example, manager system 110 can vary the weights $W_1$-$W_6$ of Eq. 1 within valid ranges over time. Over time, for each geofence deployed by manager system 110, there can be an associated accuracy score according to processes described herein. Over time, the weights $W_1$-$W_6$ of Eq. 1 can be biased in favor of weights producing higher accuracy scores. The weights $W_1$-$W_6$ of Eq. 1 can be biased away from values that historically produced accuracy scores indicating lower accuracy. The ability of manager system 110 to predict performance of a candidate geofence by running predicting process 114 can therefore improve over time. At block 1116, manager system 110 can return to block 1105 to receive additional geofence configuration data defined by an administrator user using geofence configurator administrator user interface 600.

Machine learning process 116 can include processes other than those described with reference to block 1115 of FIG. 4. Machine learning process 116 (FIG. 4) can generally manage the influx of data in data repository 112, and selectively delete data from data repository 112 for purposes of improving the accuracy of predictions performed by predicting process 114. Predicting process 114 can generally improve where the corpus of data in data repository 112 grows. Accordingly, machine learning process 116 can run processes for growing the corpus of data within areas 2121, 2122, and 2123. In another aspect, machine learning process 116 can run processes for removing "dirty data." Manager system 110 can for example iteratively examine locations area 2121, calendars area 2122, and posts area 2123 for spurious data which based on predictions according to one or more criterion and within a confidence level can be determined to be incorrect and delete such data from data repository 112. Accordingly, predictions performed by prediction process 114 can continue to improve over time for the lifetime of system 100 as the corpus of data repository 112 grows with there being mitigated risk that "dirty data" will negatively impact accuracy of a prediction.

There is set forth herein a method including predicting a performance of one or more candidate geofence and presenting an indicator of a result of the predicting; obtaining administrator user defined selection data of a selected candidate geofence; based on the obtaining the selection data deploying a selected candidate geofence, the selected candidate geofence defining a deployed geofence on deployment thereof; and providing one or more output based on an occurrence of a geofence event of the deployed geofence. There is further set forth herein a method wherein the predicting includes applying a function of weighted factors, and wherein the method includes performing a machine learning process wherein a monitoring of performance of a geofence is performed responsively to a geofence event of the deployed geofence being detected, and wherein according to the machine learning process a subsequent function for performance of a subsequent predicting is based on a result of the monitoring. There is further set forth herein a method wherein the predicting includes applying a first function, and wherein the method includes performing a machine learning process, wherein a monitoring of performance of a geofence is performed responsively to a geofence event of the deployed geofence being detected, and wherein according to the machine learning process a subsequent function for performance of a subsequent predicting is based on a result of the monitoring so that the subsequent function is biased in favor of the first function based on determining that the predicting includes a threshold level of accuracy.

Certain embodiments herein may offer various technical computing advantages, involving computing advantages to address problems arising in the realm of computer networks and particularly computer networks operating to provide services to a plurality of users capable of communicating with the network. Embodiments herein recognize that distribution of geofence breach detection logic to user computer devices for local on-device breach detection can yield significant improvements in computer network performance, e.g., in terms of bandwidth and power conservation, speed and reliability, but that the advantages can be lost if a geofence is not accurately deployed. Accordingly, features can be provided for deployment of geofences with greater accuracy to yield bandwidth and power conservation advantages. Features are included to increase the likelihood of a correct geofence being accurately deployed on a "single shot" basis to therefore avoid geofence corrections and to reliably provide a variety of advantages associated with client distribution of breach detection logic. In one aspect, on the occurrence of events commonly experienced by multiple users at a common time, the multiple users may make concurrent demands on the network to overload the network and frustrate the function of relied on services. In accordance with that aspect embodiments herein can intelligently reduce potential network loading events by intelligent management of notifications to users, e.g. by deployment of accurately configured geofences. Embodiments herein by deployment of accurately configured geofences can also address traffic flow concerns for example by reducing a risk that users will collide or bottleneck within certain areas within or about a venue on receipt of a notification. By intelligent outputting of notifications embodiments herein can impact venue and venue area traffic patterns in positive ways by reduction of health risks, safety risk, and by increasing traffic flow support under the constraint of a certain infrastructure venue layout design. Machine learning processes 116 can be performed for increased accuracy and for reduction of reliance on rules based criteria and thus reduced computational overhead. In one embodiment, a data repository can be leveraged which can be populated and managed by multiple processes including proactive data populating process invoking automated search engines searching of multiple data sources. For enhancement of computational accuracies, embodiments can feature computational platforms existing only in the realm of computer networks such as artificial intelligence (AI) platforms, and machine learning platforms. Embodiments herein can employ data structuring processes, e.g. employing Natural Language Processing (NLP) for transforming unstructured data into a form optimized for computerized processing. Embodiments herein can provide results and advantages that are not possible or practical without use of components of a technical computing environment, such as processes leveraging instantaneous queries of a data repository storing user behavior history data to develop multifactor probability determinations. Embodiments herein can examine data from diverse data sources such as data sources that process radio signals for location determination of users. Embodiments herein can include artificial intelligence processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making.

Figure 7:
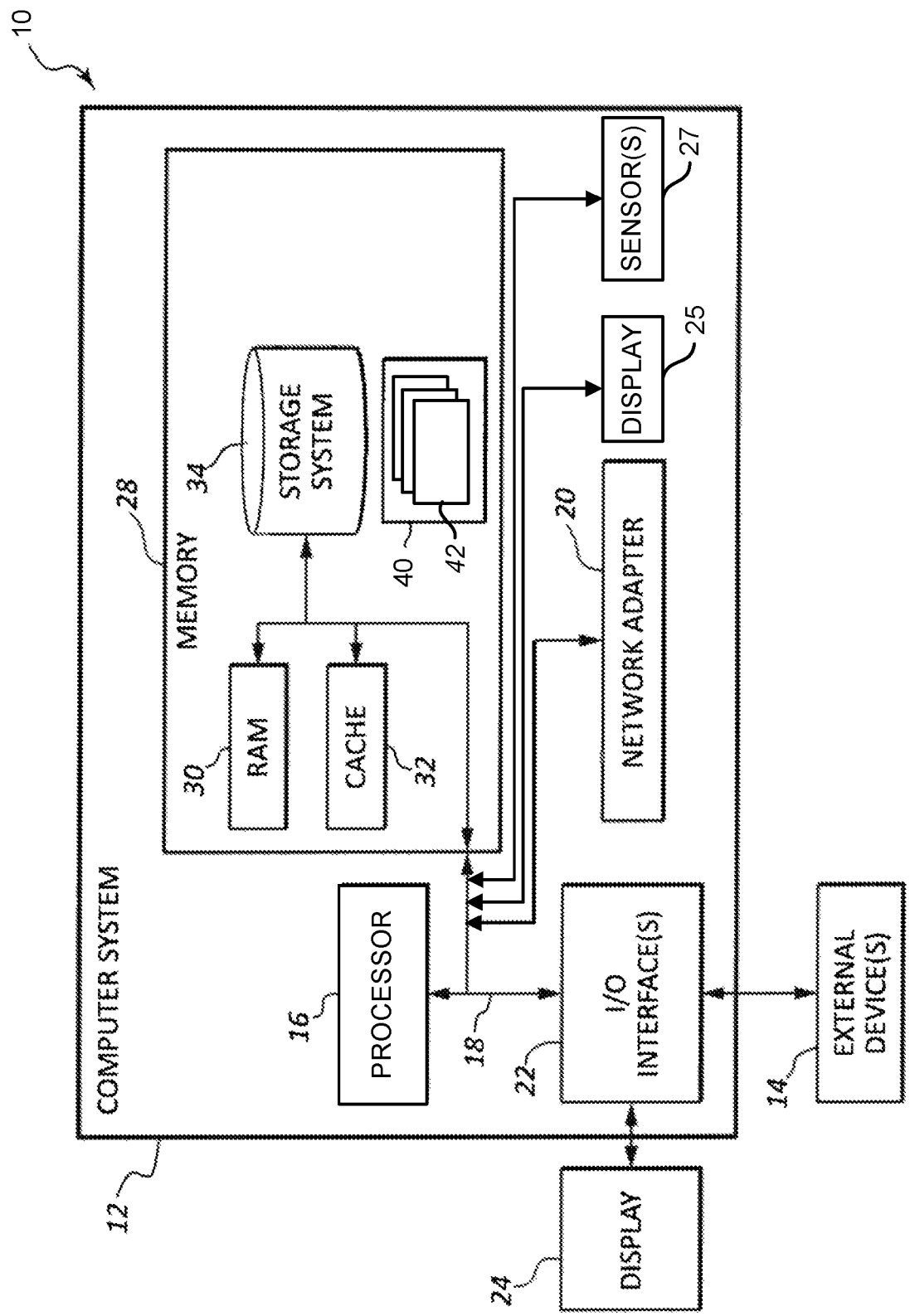
FIG. 7 depicts a computing node according to one embodiment.
Figure 8:
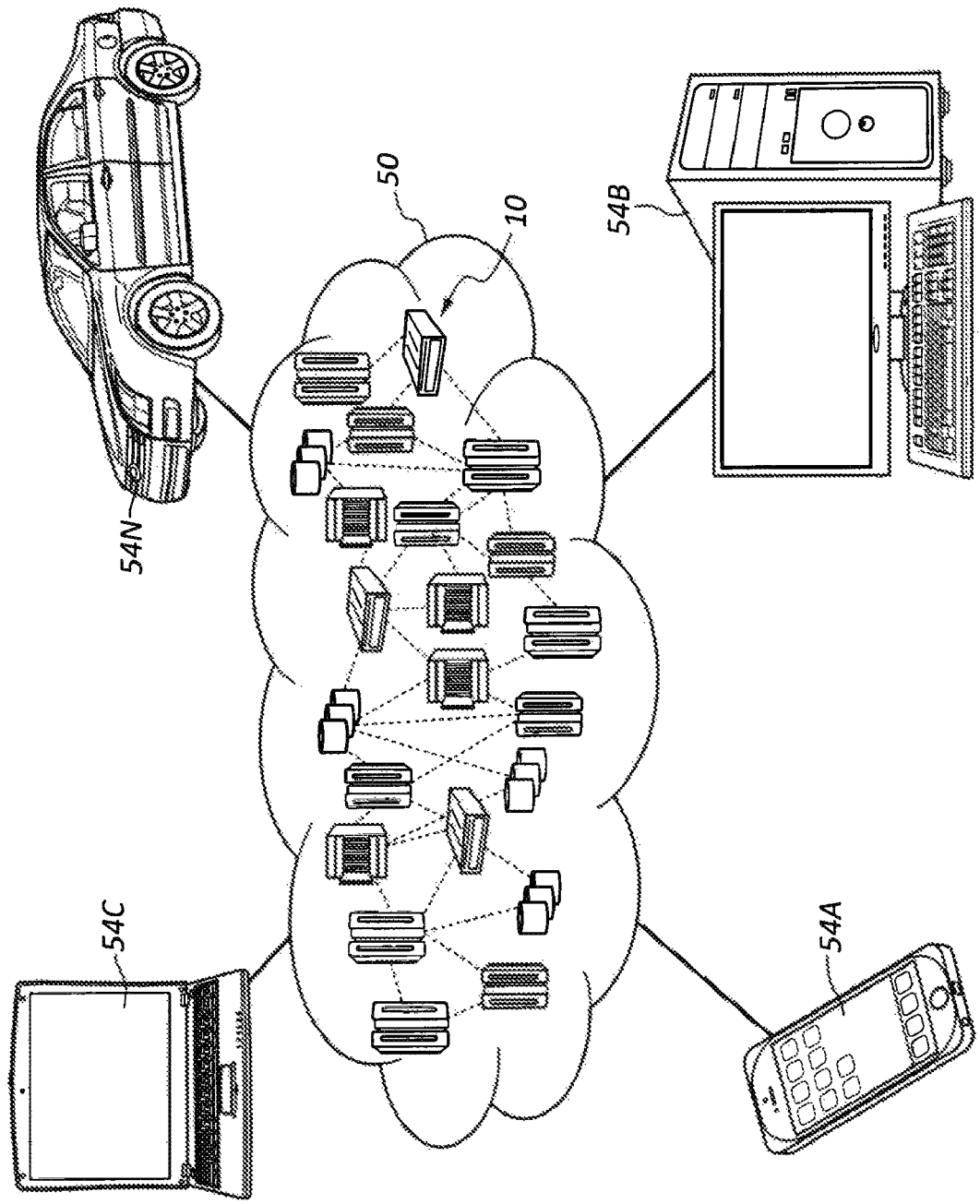
FIG. 8 depicts a cloud computing environment according to one embodiment.
Figure 9:
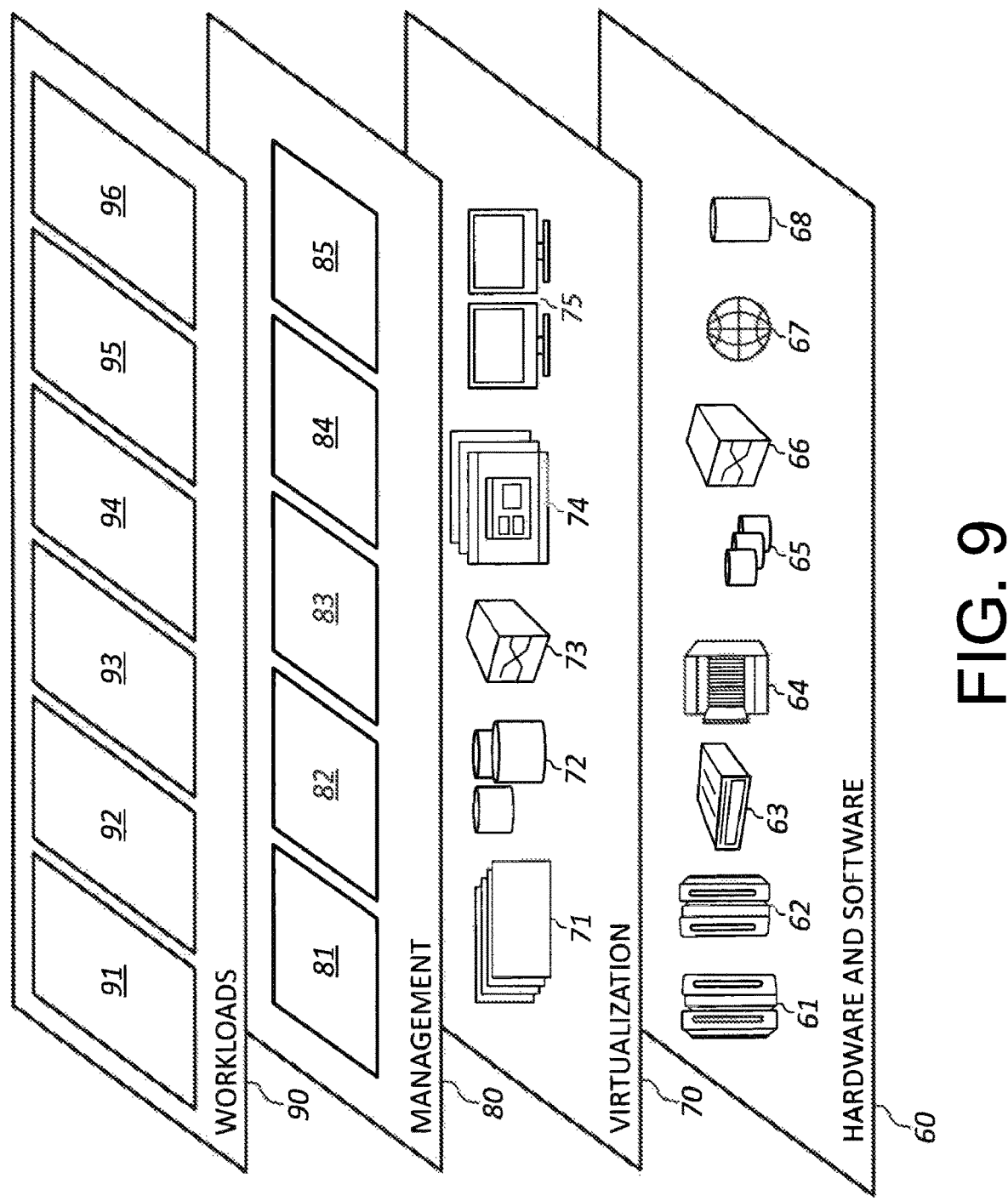
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more user computer device 130A-130Z can include one or more computing node 10 and can include one or more program 40 for performing functions described with reference to one or more user computer device 130A-130Z as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing predictions of candidate geofence performance and related processes set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
predicting a performance of one or more candidate geofence and presenting an indicator of a result of the predicting, wherein the predicting includes applying a function of weighted factors to predict a number of breaches of the one or more candidate geofence;
obtaining administrator user defined selection data of a selected candidate geofence;
based on the obtaining the selection data deploying a selected candidate geofence, the selected candidate geofence defining a deployed geofence on deployment thereof; and
providing one or more output based on an occurrence of a geofence event of the deployed geofence.

2. A method comprising:
predicting a performance of one or more candidate geofence and presenting an indicator of a result of the predicting;
obtaining administrator user defined selection data of a selected candidate geofence;
based on the obtaining the selection data deploying a selected candidate geofence, the selected candidate geofence defining a deployed geofence on deployment thereof; and
providing one or more output based on an occurrence of a geofence event of the deployed geofence.

3. The method of claim 2, wherein the geofence event includes a geofence event selected from the group consisting of a breach event, a dwell event, and a geofence expiration event.

4. The method of claim 2, wherein the one or more output includes sending a notification to user computer device that has breached the deployed geofence.

5. The method of claim 2, wherein the one or more output includes a communication to initiate a process to monitor performance of the deployed geofence.

6. The method of claim 2, wherein the predicting includes predicting a number of breaches of the one or more candidate geofence.

7. The method of claim 2, wherein the predicting includes applying a function of weighted factors to predict a number of breaches of the one or more candidate geofence, the factors each being selected from the group consisting of (a) a location trends factor, wherein historical location trends of computer device users are examined (b) a traffic factor, wherein traffic patterns are examined (c) an entertainment event factor, wherein entertainment events in an area of the one or more candidate geofence are examined, (d) a calendar factor, wherein calendared events of users are examined, (e) a social media factor, wherein tags of social media posts of users are examined and (f) an item need factor wherein items of need to users are examined.

8. The method of claim 2, wherein the deploying includes a manager system remote from a plurality of user computer devices sending geofence configuration data to the plurality of user computer devices.

9. The method of claim 2, wherein the method includes simultaneously displaying the indicator and an administrator user interface, wherein the administrator user interface facilitates entry of one or more input by an administrator user to define the administrator user defined selection data of a selected candidate geofence.

10. The method of claim 2, wherein the method includes a manager system remote from a plurality of user computer devices sending geofence event detection software for installation on the plurality of user computer devices so that the plurality of user computer devices are configured to locally perform geofence event determinations.

11. The method of claim 2, wherein the predicting includes applying a function of weighted factors, and wherein the method includes performing a machine learning process wherein a monitoring of performance of a geofence is performed responsively to a geofence event of the deployed geofence being detected, and wherein according to the machine learning process a subsequent function for performance of a subsequent predicting is based on a result of the monitoring.

12. The method of claim 2, wherein the predicting includes applying a first function, and wherein the method includes performing a machine learning process, wherein a monitoring of performance of a geofence is performed responsively to a geofence event of the deployed geofence being detected, and wherein according to the machine learning process a subsequent function for performance of a subsequent predicting is based on a result of the monitoring so that the subsequent function is biased in favor of the first function based on determining that the predicting includes a threshold level of accuracy.

13. The method of claim 2, wherein the geofence event includes a geofence event selected from the group consisting of a breach event, a dwell event, and a geofence expiration event, wherein the one or more output includes sending a notification to user computer device that has breached the deployed geofence, wherein the one or more output includes a communication to initiate a process to monitor performance of the deployed geofence, wherein the predicting includes applying a function of weighted factors, wherein the deploying includes a manager system remote from a plurality of user computer devices sending geofence configuration data to the plurality of user computer devices, wherein the method includes a manager system remote from a plurality of user computer devices sending geofence event detection software for installation on the plurality of user computer devices so that the plurality of user computer devices are configured to locally perform geofence event determinations, and wherein the method includes performing a machine learning process wherein a monitoring of performance of a geofence is performed responsively to a geofence event of the deployed geofence being detected, and wherein according to the machine learning process a subsequent function for performance of a subsequent predicting is based on a result of the monitoring.

14. The method of claim 2, wherein the geofence event includes a geofence event select from the group consisting of a breach event, a dwell event, and a geofence expiration event, wherein the one or more output includes sending a notification to user computer device that has breached the deployed geofence, wherein the one or more output includes a communication to initiate a process to monitor performance of the deployed geofence, wherein the predicting includes applying a function of weighted factors, the factors each being selected from the group consisting of (a) a location trends factor, wherein historical location trends of computer device users are examined (b) a traffic factor, wherein traffic patterns are examined (c) an entertainment event factor, wherein entertainment events in an area of the one or more candidate geofence are examined, (d) a calendar factor, wherein calendared events of users are examined, (e) a social media factor, wherein tags of social media posts of users are examined and (f) an item need factor wherein items of need to users are examined, wherein the deploying includes a manager system remote from a plurality of user computer devices sending geofence configuration data to the plurality of user computer devices, wherein the method includes a manager system remote from a plurality of user computer devices sending geofence event detection software for installation on the plurality of user computer devices so that the plurality of user computer devices are configured to locally perform geofence event determinations, wherein the predicting includes applying a function of weighted factors, and wherein the method includes performing a machine learning process wherein a monitoring of performance of a geofence is performed responsively to a geofence event of the deployed geofence being detected, and wherein according to the machine learning process a subsequent function for performance of a subsequent predicting is based on a result of the monitoring.

15. The method of claim 2, wherein the predicting includes predicting a number of breaches of the one or more candidate geofence in dependence on a scheduling of entertainment events in an area of the one or more candidate geofence.

16. A computer program product comprising:
a computer readable storage medium readable by one or more processing circuit and storing instructions for execution by one or more processor for performing a method comprising:
predicting a performance of one or more candidate geofence and presenting to an administrator user an indicator of a result of the predicting;
obtaining from the administrator user administrator user defined selection data of a selected candidate geofence;
based on the obtaining the selection data from the administrator user deploying a selected candidate geofence, the selected candidate geofence defining a deployed geofence on deployment thereof; and
providing one or more output based on an occurrence of a geofence event of the deployed geofence.

17. The computer program product of claim 16, wherein the deploying includes a manager system remote from a plurality of user computer devices sending geofence configuration data to the plurality of user computer devices.

18. The computer program product of claim 16, wherein the one or more output includes a communication to initiate a process to monitor performance of the deployed geofence.

19. The computer program product of claim 16, wherein the predicting includes predicting a number of breaches of the one or more candidate geofence.

20. A computer program product comprising: a computer readable storage medium readable by one or more processing circuit and storing instructions for execution by one or more processor for performing the method of claim 2, wherein the predicting includes applying a function of weighted factors to predict a number of breaches of the one or more candidate geofence, the factors including each of (a) a location trends factor, wherein historical location trends of computer device users are examined (b) a traffic factor, wherein traffic patterns are examined (c) an entertainment event factor, wherein entertainment events in an area of the one or more candidate geofence are examined, (d) a calendar factor, wherein calendared events of users are examined, (e) a social media factor, wherein tags of social media posts of users are examined and (f) an item need factor wherein items of need to users are examined.

* * * * *